United States Patent [19]

Mazzola et al.

[11] Patent Number: 4,833,962

[45] Date of Patent: May 30, 1989

[54] INSTALLATION FOR PERFORMING ALL AFFINE TRANSFORMATIONS FOR MUSICAL COMPOSITION PURPOSES

[76] Inventors: Guerino B. Mazzola, Wangenstrasse 11, CH-8600 Dübendorf; Walter Eschbach, Oberwis 4, C-8307 Tagelswangen, both of Switzerland

[21] Appl. No.: 935,500

[22] PCT Filed: Mar. 12, 1985

[86] PCT No.: PCT/CH85/00044

§ 371 Date: Jan. 12, 1987

§ 102(e) Date: Jan. 12, 1987

[87] PCT Pub. No.: WO86/05616

PCT Pub. Date: Sep. 25, 1986

[51] Int. Cl.[4] ........................ G09B 15/04; G10H 7/00

[52] U.S. Cl. ........................................ 84/1.01; 84/478

[58] Field of Search ...................... 84/1.01, 1.03, 1.28, 84/462, 464 R, 464 A, 477 R, 478

[56] References Cited

U.S. PATENT DOCUMENTS 3,926,088 12/1975 Davis et al. ...................... 84/1.01 X
4,399,731 8/1983 Aoki .................................... 84/1.03

FOREIGN PATENT DOCUMENTS 0143578 6/1985 European Pat. Off. .

*Primary Examiner*—Stanley J. Witkowski
*Attorney, Agent, or Firm*—Thomas W. Speckman

[57] ABSTRACT

A composition or a series of notes to be transposed are introduced with mathematical data into the memory (11) of a computer (1). A calculator (12) works out the data and a control unit (13) actuates an optical (4) or acoustical (3) output device. All the series of notes received and calculated may be addressed by the computer to a memory (5) external to the computer.

14 Claims, 3 Drawing Sheets

INSTALLATION FOR PERFORMING ALL AFFINE TRANSFORMATIONS FOR MUSICAL COMPOSITION PURPOSES

BACKGROUND OF THE INVENTION

Field of the Invention

The present invention concerns an installation for performing all affine transformations in the range of musical compositions. Such installations particularly serve scientific and musical education ends, and can be used in the teaching of musical composition.

Both in the mathematical institutes of various universities, as well as in musical conservatories, famous compositions are analyzed for intensive study. For purposes of analysis, portions of the compositions are transcribed in accordance with mathematical rules. The basic operations used for this purpose are the following:

Reflection

Transposition

Displacements and

Transvections

In addition to these basic operations, all kinds of combinations of these basic operations are of interest as well.

In the past, such analyses were carried out by means of manual transcription. The resulting expense was enormous. The resulting compositions also frequently yielded hard-to-play compositions, with fingerings which a musician could either play not at all, or only do so with an inordinate amount of practice.

Nevertheless, simpler transcriptions of the type stated above have been made for centuries, even by famous musicians and composers.

SUMMARY OF THE INVENTION

The present invention has as its task that of creating an installation which makes possible, in their entirety, affine transformations in the range of compositions, and which plays them as well.

This task is solved by means of an installation of the type already described, which is characterized in that it comprises at least one input device for inputting the data of the melody to be transposed, and the mathematical functions to be carried out, as well as a computer with a memory and control unit for carrying out the mathematical operations, as well as for controlling an electronically controlled musical instrument, which serves as an acoustical output device.

BRIEF DESCRIPTION OF THE DRAWINGS

The attached diagrams depict one embodiment of the installation in accordance with the invention, as well as individual devices of the installation. These show.

DESCRIPTION OF PREFERRED EMBODIMENTS

Figure 1:
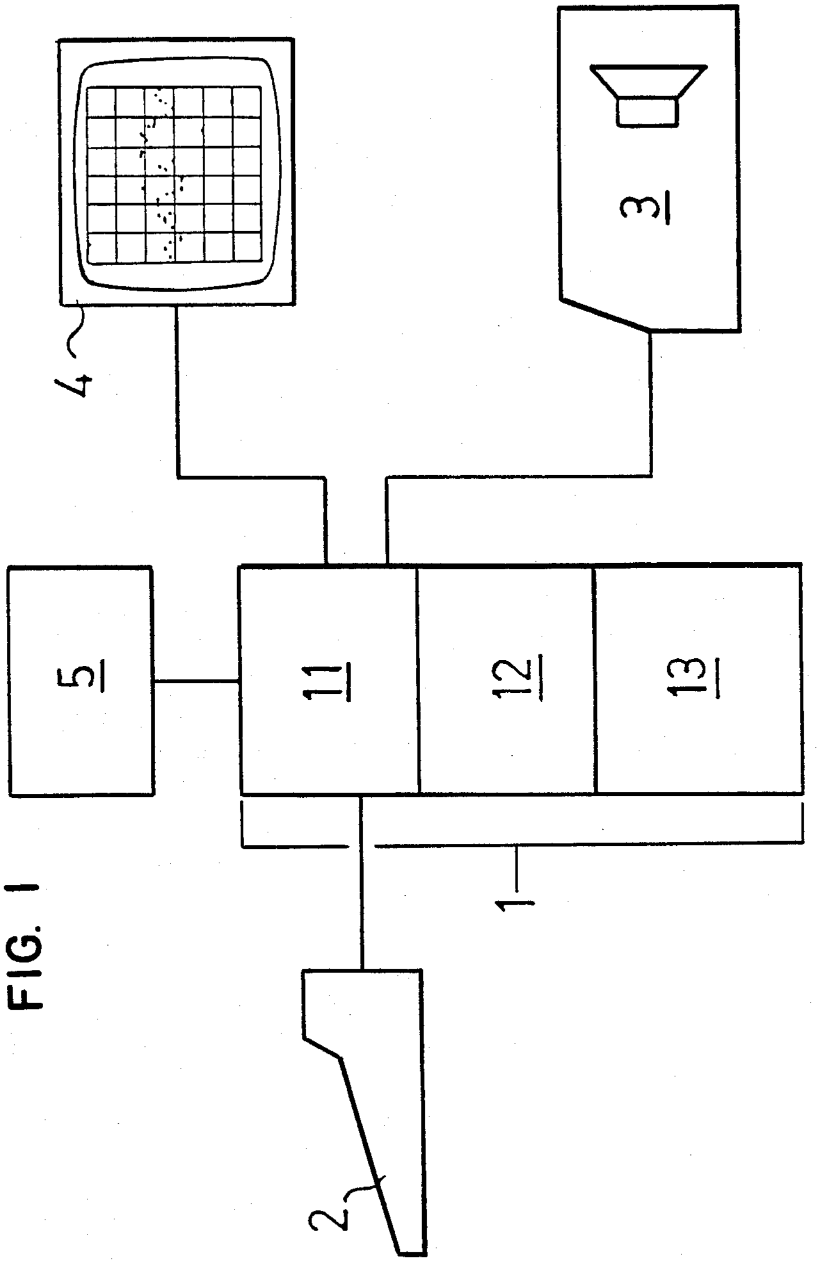
FIG. 1: a schematic diagram of the installation.

As can be seen from the schematic diagram of FIG. 1, the installation comprises five units, to which, however, further units may be connected as desired. The core of the installation is formed by a computer (1), which is supplied with musical and mathematical data from an input device (2). The input data are stored in the memory (11) inside the computer. The calculator (12) of the computer (1) processes the musical data input by input device (2), in accordance with the mathematical data likewise supplied by the input device. In the control command unit of input device (2), the entire affine transformation of the input compositions is carried on an integral matrix, and is played by a musical instrument (3) which is electronically controlled by the control unit (13) of the computer (1).

The electronically controlled musical instrument (3), which serves as an acoustical output device for the installation, may, for example, be an electronic organ. The computer (1), input device (2), and output device (3) represent the minimal construction of the installation.

Various additions to the minimal construction of the installation may simplify the work and deepen the understanding.

Among these are, for example, a monitor (4), on which the musical data stored in memory (12) of the computer (1) are made visible. After carrying out the desired transformation, the transformed series of notes appears on the picture tube of the monitor. This makes it possible to correct the transformation performed through the input of further data, if such is necessary.

In a memory (5) external to the computer (1), the information about the transformed series of notes can be permanently stored, on tapes or diskettes, for example, and can be retrieved again through access to the computer (1).

By means of an additional picture tube belonging to the input device (2), which is not depicted in the diagram, the information input may be made directly visible, and may be controlled directly by the operating personnel, before it is conveyed to the computer.

Figure 2:
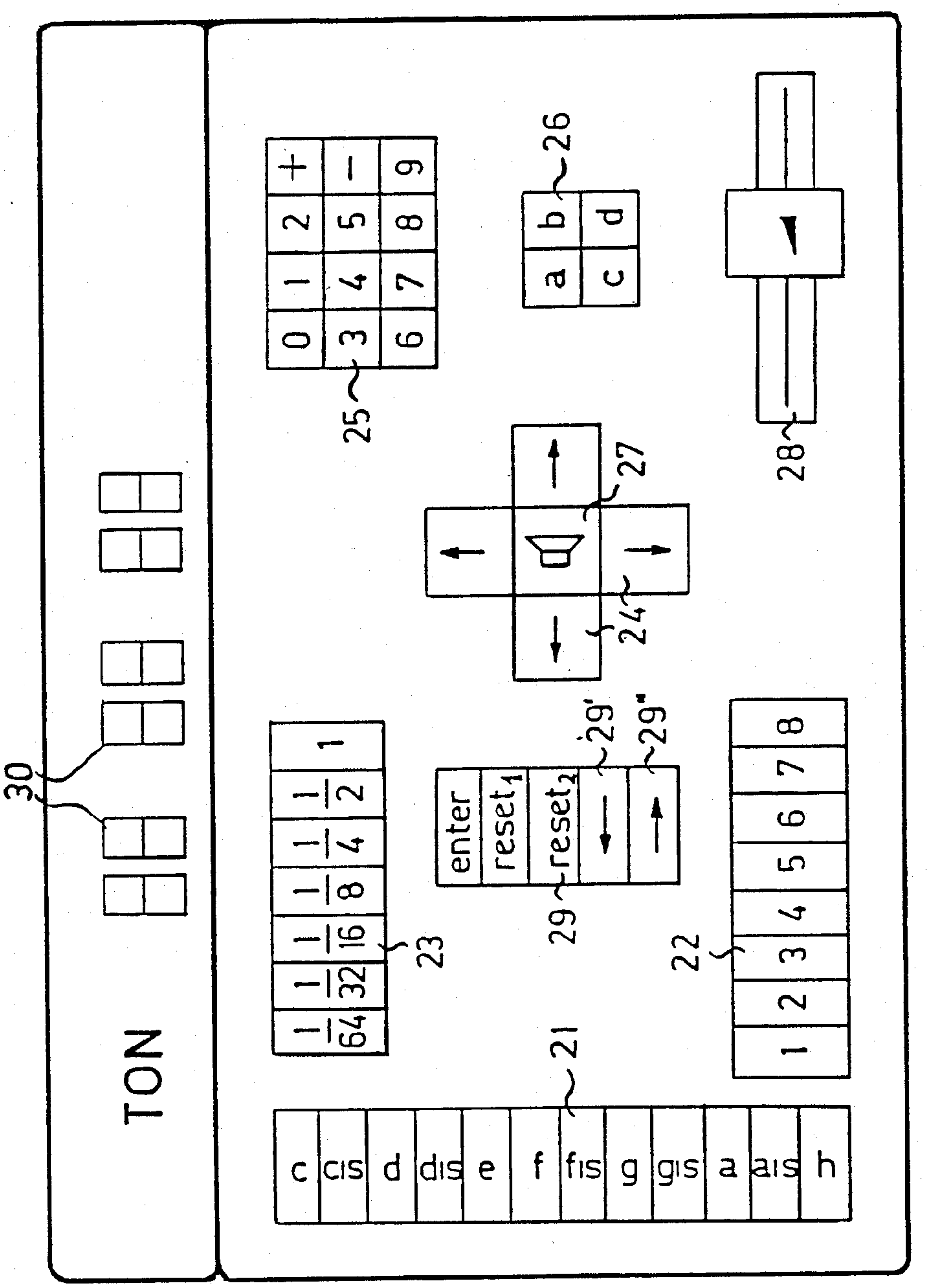
FIG. 2: a view of the operating board of the input device of the installation.

In FIG. 2, an embodiment of the operating surface of input device (2) is depicted. The operating surface has both input keyboards for musical as well as mathematical data, as well as operating units for playback reproduction.

A row of keys (21) positioned laterally on the left, which has twelve keys, serves to determine the pitch of the input note. The scale goes from c to h, and takes half tones into account. This yields the series of notes c, cis, d, dis, e, f, fis, g, gis, a, ais (or b) and h—just like the keyboard of a clavier.

The row of keys (22) depicted below in the diagram of the operating surface serves to determine the desired octave. The individual keys are sequentially numbered from 1 to 8. The keyboards (21 and 22) together define the input tones.

Finally, the data regarding the length of the notes can be input by means of a keyboard. The scale (23) goes here from a simple, absolute unit of time, over any multiples desired, up to the maximum period of 64 divisions. A corresponding pause can be input with this keyboard alone. With the three keyboards (21 to 23) described, all the musical data can be entered.

The mathematical functions to be performed are also distributed over the three keyboards. Approximately in the center of the surface, five keys (24) are positioned in a cruciform manner. The four keys which form the arms of the cross are provided with arrows, which show the direction of translation. According to the form of execution, the level of the translation may be accomplished either through a corresponding number of activations of the corresponding keys, or by means of the key set (25), which contains all the numbers from 0 to 9. The meaning of these coordinate data is described in the following text.

The small, quadratic key set (26), consisting of four keys, serves for the input of a matrix. The integral values of the matrix are in turn input via the key set (25), with consideration to the prefix. By means of the matrix, all the rotations, reflections, and transvections can be performed. All transpositions take place around a coordinate point, so that, according to one's desire for the reflection axis or the transposition point, the function must still be completed by means of a corresponding transposition.

Finally, we may consider the operation of the output unit. In connection with this, in the previously mentioned cruciform key set (24), a key (27) with a loudspeaker symbol is provided in the middle, by means of which the input and the transposed series of notes can be played at any time. The playing tempo can finally also be influenced by means of the slide register (28).

Figure 3:
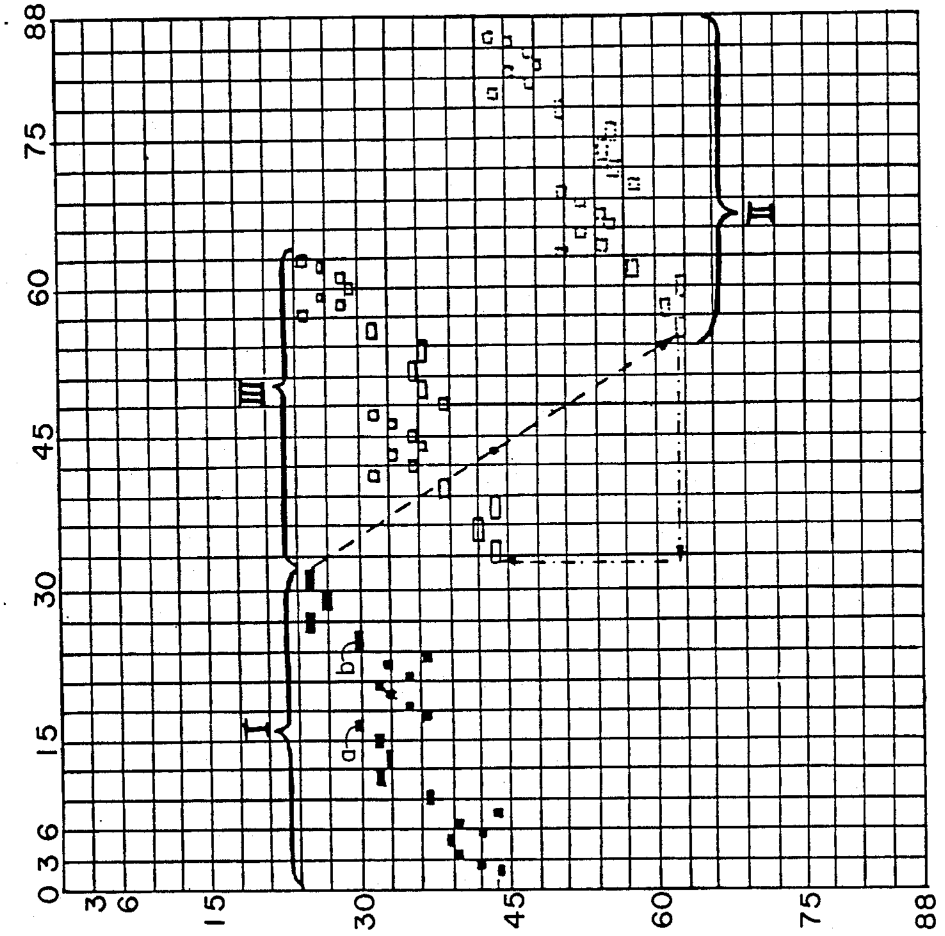
FIG. 3: an example of an inputting and transposing series of notes.

In FIG. 3, there is depicted a diagram of a coordinate network visible on the picture tube of a monitor (4). On the X-axis, there are 88 application times for notes, which are presented as coordinates. To make the diagram more comprehensible, only every third coordinate network line is given. Each quadrate shown corresponds to three unit time intervals. The unit intervals in these coordinates correspond to freely selectable time intervals in which the applications of the notes take place, as soon as the music is played.

The Y-coordinates (1–88) give the tonal pitches corresponding to the 88 keys of a clavier keyboard. Each coordinate unit in the Y-direction therefore corresponds to a half-tone step. Each quadrate of the coordinate lines thus corresponds to three half-tones.

In FIG. 3, the tone "a" (no reference to the note "a") has the length of a unit tone interval; tone "b" has a doubled length, that is to say, two unit tone intervals. In the Bach compositions, tone "a" corresponds to a 1/16th-note, the tione "b" corresponds to a ⅛-note.

The notes of the first two beats of Composition number 1 by J. S. Bach (Schmieder List number 772) are shown fully written out (tone series I). In the dotted line, the same series of notes is shown reflected around the coordinate point 44/44 (tone series II). Tone series II was further displaced in the vertical and horizontal direction relative to tone series III.

Tone series I and III can be played as a continuious series of notes by activating the key (27). The tone length may be symbolized on the picture screen. In contrast the notes, the tone length is, however, not represented as an absolute value, but only as a relative value. The computer simply takes the value I of a unit time interval for the shortest tone, and all other tones are an integral multiple of this. The absolute tone length is adjusted by the slide regulator (28), and can be changed as desired. In this manner, the relations of the tone length are maintained.

By means of the operational function keys (29), the adjusted tone sequences and the transformed tone sequences can be stored in memory. Furthermore, individual notes or parts of the tone sequence, as well as the entire series of notes, can be reset by means of the "reset" keys. Both the keys (29' and 29") indicated by means of the arrows allow a displacement of the tone time in one direction or another.

For simpler control of the input musical data, optical indicator elements (30) are provided on the operating surface. The three data evident through the 7-segment indicators are the tone time (X-value in the coordinate network), the tonal pitch (Y-value in the coordinate network), and the tone length.

In addition to the embodiment of an installation described here, the installation may, however, also be provided with other input and control devices. Thus, instead of the monitor, a plotter may be installed, which expresses the input and transformed tonal sequences.

It is furthermore possible to directly input the input data by means of a digitalizing device. Such coordinate determining devices are sold by various manufacturers. The devices comprise a digitalizing plate with a transmitter or receiver, as well as a menu field which can be installed at any desired point of the digitalizing plate, by means of which all additional information, such as tone time, tone length, tone type, tempo, transposition type, as well as operating functions can be input through reading by means of the reading stylus.

We claim:

1. An apparatus for carrying out affine transformations on musical compositions, comprising at least one input means for entry of musical data comprising pitch, octave and length of musical notes representing a melody to be transformed and mathematical data comprising direction of translation, level of translation, and desired matrix for said affine transformation representing mathematical operations to be performed on said music data; a computer comprising a memory and control unit connected to said input means and capable of carrying out mathematical operations determined by said mathematical data on said musical data deriving output data representing the transformed melody; and means for generating an acoustic output from said output data connected to said computer.

2. An apparatus according to claim 1, further comprising a monitor on which said output data is visibly displayed is connected to said computer.

3. An apparatus according to claim 1, further comprising an external memory for permanent storage connected to said computer.

4. An apparatus according to claim 1, further comprising a visual monitor having x-y axis connected to said computer.

5. An apparatus according to claim 1, wherein said input means is a digitizing means having input keys for musical data comprising pitch, octave and length of the musical notes and input keys for mathematical data comprising direction of translation, level of translation, and desired matrix for said affine transformation.

6. An apparatus according to claim 1, wherein said means for generating an acoustic output is an electronic organ.

7. An apparatus according to claim 2 wherein said input means is a digitizing means having input keys for musical data comprising pitch, octave and length of the musical notes and input keys for mathematical data comprising direction of translation, level of translation, and desired matrix for said affine transformation.

8. An apparatus according to claim 2, further comprising an external memory for permanent storage connected to said computer, and wherein said input means is a digitizing means having input keys for musical data comprising pitch, octave and length of the musical notes and input keys for mathematical data comprising direction of translation, level of translation, and desired matrix for said affine transformation.

9. An apparatus according to claim 8, wherein said means for generating an acoustic output is an electronic organ.

10. An apparatus according to claim 2, wherein said means for generating an acoustic output is an electronic organ.

11. An apparatus according to claim 2, further comprising an external memory for permanent storage connected to said computer.

12. An apparatus according to claim 11, wherein said input means is a digitizing means having input keys for musical data comprising pitch, octave and length of the musical notes and input keys for mathematical data comprising direction of translation, level of translation, and desired matrix for said affine transformation.

13. An apparatus according to claim 12, wherein said means for generating an acoustic output is an electronic organ.

14. A process for carrying out affine transformations on musical compositions, comprising: entering musical data comprising pitch, octave and length of musical notes representing a melody on a computer input means; entering mathematical data comprising direction of translation, level of translation and desired matrix for said affine transformation representing mathematic operations to be performed on said musical data on a computer input means; controlling said computer to perform said affine transformations on said musical data generating output data representing affine transformed melody; and generating acoustic output from said output data.

* * * * *